Figure 1:
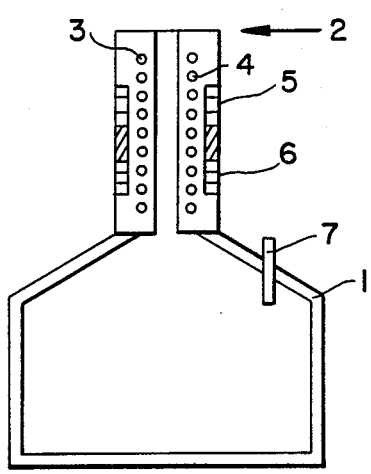

United States Patent [19]

Burgos

[11] Patent Number: 4,905,513
[45] Date of Patent: Mar. 6, 1990

[54] WIND SPEED MEASURING DEVICE

[75] Inventor: Ernesto Burgos, Yverdon, Switzerland

[73] Assignee: Institut De Recherche et de Development Aerologique Marketing S.A., Yverdon, Switzerland

[21] Appl. No.: 266,272

[22] Filed: Oct. 26, 1988

Related U.S. Application Data

[63] Continuation of Ser. No. 709,321, filed as PCT CH84/00096 on Jun. 14, 1984, published as WO85/00059 on Jan. 3, 1985, abandoned.

[30] Foreign Application Priority Data

Jun. 17, 1983 [CH] Switzerland ............... 3316/83

[51] Int. Cl.$^4$ ................... G01W 1/00; G01P 5/12
[52] U.S. Cl. ............................. 73/188; 73/189; 73/204.26
[58] Field of Search .............. 73/188, 189, 204.25, 73/204.26; 364/510, 723

[56] References Cited

U.S. PATENT DOCUMENTS

| | | | |
|---|---|---|---|
| 3,352,154 | 11/1967 | Djorup | 73/189 |
| 3,359,794 | 12/1967 | Rosenberg | 73/189 |
| 3,604,261 | 9/1971 | Olin | 73/189 |
| 3,995,480 | 12/1976 | Edgerton | 73/188 |
| 4,391,137 | 7/1983 | Kerfoot | 73/204 |
| 4,637,253 | 1/1987 | Sekimura et al. | 73/189 |

FOREIGN PATENT DOCUMENTS

| | | | |
|---|---|---|---|
| 2605195 | 8/1977 | Fed. Rep. of Germany. | |
| 0594458 | 2/1978 | U.S.S.R. | 73/189 |
| 1015308 | 4/1983 | U.S.S.R. | 73/204 |

Primary Examiner—Herbert Goldstein
Attorney, Agent, or Firm—Michael N. Meller

[57] ABSTRACT

A wind speed meter comprises a housing and a sensor means arranged thereon. The sensor means is heated by a heating coil whereby the temperature of the metal cylinder which constitutes the mass of the sensor means is measured by a resistivity-sensor. After subtraction of the environmental temperature a temperature difference is obtained which depends from the heating effect of the heating coil and the cooling effect from the wind. In view of a constant heating power the cooling effect of the wind which is proportional to its speed may be exactly determined. Further embodiments of the wind meter may comprise a plurality of resistivity sensors around the sensor means, by which the distribution of the temperature around the metal cylinder may be measured, thereby determining the direction of the wind.

11 Claims, 2 Drawing Sheets

WIND SPEED MEASURING DEVICE

This application is a continuation, of application Ser. No. 709321, filed as PCT CH84/00096 on Jun. 14, 1984, published as WO85/00059 on Jan. 3, 1985, now abandoned.

The invention relates to a wind speed measuring device comprising a heated sensor means exposed to the wind, said sensor means encompassing a temperature dependent electrical resistance being kept in intimate thermal contact with said heated sensor means, and a measuring device being connected to said electrical resistance.

U.S. Pat. No. 4,279,147 discloses a wind speed meter, which, in principle, comprises two temperature dependent resistors being arranged within a Wheatstone bridge. These resistivity-sensors are exposed to the wind, such that the cooling effect of the passing air is different at each sensor, notably in dependance on the wind speed. The resistivity sensors are of the hot-wire type, comprising a platinum film arranged around a cylindrical substrate along its entire length.

The principle of the measurement consists in heating the two resistivity sensors by ohmic heat up to the point where the sum of their respective resistivities attains a predetermined value. When this point is reached, the difference between the resistivities of the two resistances is evaluated. One of the drawbacks of this kind of measurement is that the allocation of a certain wind speed to a given signal is made by means of an empirically obtained calibration curve. The accuracy of this calibration curve is considerably decreased, however, due to undefined changes of the surface of the hot-wire sensor e.g. by environmental deposits, corrosion and so forth which falsify the result.

The above US Patent further serves in determination of the direction of the wind, whereby a signal depending on the direction of the wind is obtained by the difference of said two resistivity-sensors. This may lead to an ambiguity of the result, as in certain cases it may not be determined whether a certain difference between the resistivities of the two resistivity-sensors is due to a certain direction or a certain speed of the wind.

U.S. Pat. No. 4,206,683 discloses a similar wind speed meter, which comprises an arrangement of resistivity-sensors which is different than the arragement according to the first above mentioned patent. Herewith it is possible to measure the speed and the direction of the wind in different planes, the measuring method being the same as in the first above described patent.

It is the object of the invention to provide a measuring device for the speed of the wind which has an improved accuracy over the prior art, and which maintains this accuracy under difficult environmental conditions such as in sea water and desert environments.

According to the invention, the above objects are met with the provision of a wind speed measuring device comprising a heated sensor means exposed to the wind, said sensor means encompassing a temperature dependent electrical resistance kept in intimate thermal contact with said heated sensor means, and a measuring device being connected to said electrical resistance, characterized in the sensor means comprising a mass being heated by a heating means up to a temperature which is essentially uniformly distributed all over the said mass, said temperature being measured by said resisitivity-sensors in a manner as to not change said temperature.

The sensor means according to the invention may advantageously comprise a metallic cylinder, which according to its low specific heat capacity requires only a small amount of energy to be heated to a temperature which is greater than the environmental temperature.

The resistivity-sensor may be comprised of a film-like resistance wound around the metallic cylinder and kept in intimate thermal contact thereto, but electrically insulated therefrom. The temperature of the film-resistance is the same as the temperature of the metal cylinder due to the intimate thermal contact therebetween. Thus, sufficient heat transfer is assured between the metallic cylinder and the film-resistance for the temperature measurement.

The film-resistance may be a frequency determining resistance of an electronic timer (IC 555), which allows a very accurate determination of the resistivity.

The sensor means may comprise a second resistivity-sensor including a plurality of sub-sensors, which may deliver sub-signals by which the direction of the wind may be determined. By this arrangement of sub-sensors the exact direction of the wind may be obtained rather then only a left-right statement.

The resistivity-sensor and each sub-sensor may be followed by logical circuits which yield digital signals dependent on the measured electrical resistances. The digital character of the data processing equipment provides a higher standard of accuracy, and it is further provided that the results are not influenced by aging effects of electronical parts.

The signals of the logical circuit may be fed into a microprocessor, the evaluation program of which also assures the maintainance of the accuracy of the measurements over time.

The output signal which corresponds to the measured wind speed and/or direction may be used for a control operation which depends on the wind speed, such as correction modes for targeting.

The invention further relates to a method of measuring the wind speed, whereby an electrical signal is produced by a sensor means which is simultaneously heated and cooled by the wind, said signal depending on the electrical resistance of the resistivity-sensor, whereby the sensor means are heated by a heating means in a manner independent from the auto-heating of the resistivity-sensor, the temperature balanced between the heating by the heating means and the cooling by the wind being measured by the resistivity-sensor.

The method according to the invention may further be characterized in that components of the wind speed corresponding to directions under which sub-sensors are exposed to the wind are measured by said subsensors and the speed of the wind is calculated. by logic combination of said components.

Figure 3:
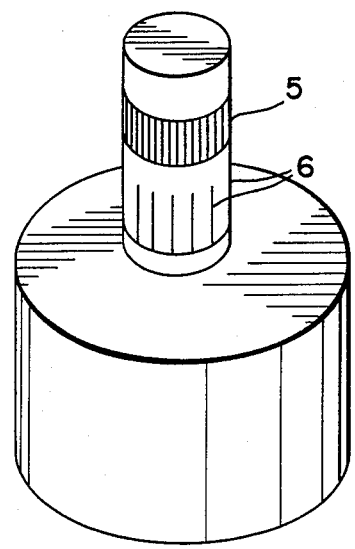
Figure 2:
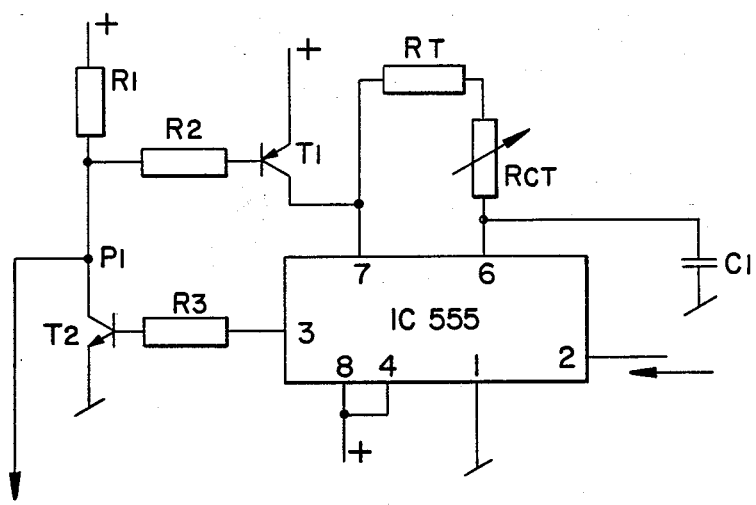
Figure 4:
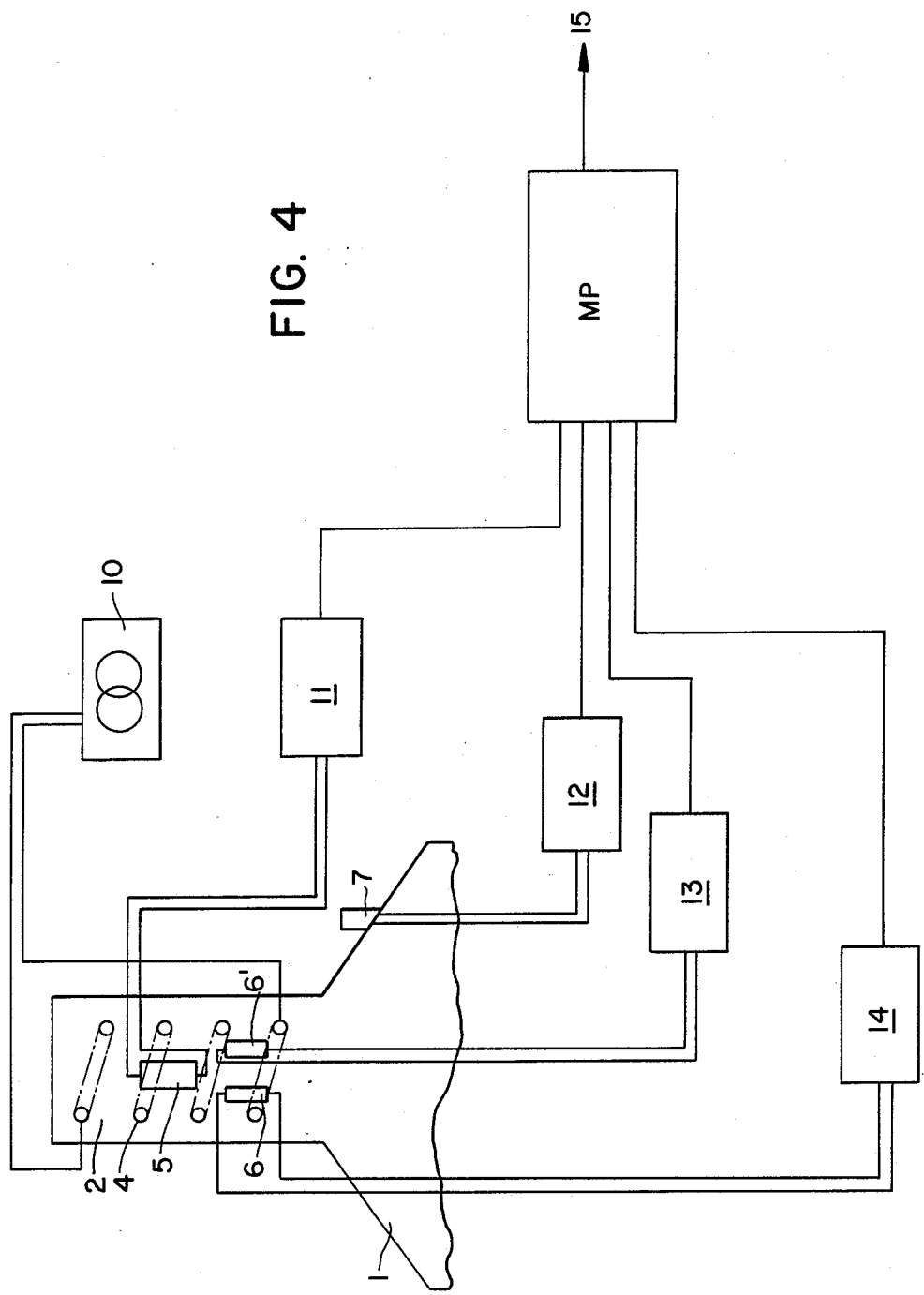

In the following the invention will be better understood with reference to the description of a preferred embodiment and the accompanying drawings, wherein FIG. 1 shows the geometric design of a wind speed meter according to the invention, FIG. 2 shows a logical evaluation circuit for the determination of the resistance of the various resistivity-sensors resp. the sub-sensors, FIG. 3 shows a perspective view of the wind speed meter according to FIG. 1, and FIG. 4 shows a block diagram of the signal processing.

With reference to FIG. 1 a measuring device for the speed of the wind is illustrated comprising an essentially cylindrical housing 1 containing all electronic parts (not shown), having a sensor means 2 on top. The sensor means 2 comprises a metal cylinder 3, which in the illustrated case is a hollow cylinder, the wall of which comprises a heating coil 4. The insertion of the heating coil 4 into the metal cylinder may e.g. be carried out by encasing one sub-cylinder within another, the inner sub-cylinder comprising a thread containing the heating coil. A system of resistance-films is wound around the outer surface of the metal cylinder 3, comprising one resistance-film which substantially surrounds the metal cylinder 3 over essentially 360° except a small slot, which is not shown. Contact points are arranged at both sides of the slot by which the resistance-film may be connected with the computing circuit.

The second ring of resistance-films comprises a series of sub-resistances which are equidistantly arranged around the metal cylinder 3, by which differences in the circumferential distribution of the temperature around the cylinder may be detected. The arrangement of the resistance-film 5 and the sub-resistances 6 may easily be understood from the perspective view of FIG. 3.

With reference to FIG. 2 there is illustrated a logical timer circuit comprising as its principal component an integrated circuit with the international denomination IC 555. The timer circuit comprises a transistor $T_1$ the base of which is connected to the positive potential across two resistances $R_1$ and $R_2$. The collector of transistor $T_1$ is connected with pin 7 of the IC 555 which, in turn, is connected with pin 6 of the IC 555 across a temperature dependent resistance $R_T$ in series with a variable resistance $R_{CT}$. Further, pin 6 is connected to ground via a capacitor $C_1$. The IC 555 has a pin 2 serving as start/reset input. Pin 1 is connected to ground, the pins 4 and 8 are connected to the positive potential. Pin 3 is the signal output which is connected via resistance $R_3$ to the base of a second transistor $T_2$. The emitter of transistor $T_2$ is connected to ground and the collector thereof is connected with a point $P_1$ which lies between the resistances $R_1$ and $R_2$. The signal output of the illustrated timer circuit is represented by the collector of transistor $T_2$. The function of the above described timer circuit is the following:

When the transistor $T_1$ is open a charging current flows across the resistances $R_T$ and $R_{CT}$ which loads the capacitor $C_1$. When a certain threshold of the voltage is attained at the capacitor $C_1$, which is indicated to pin 6 of the IC 555, the output 3 of the IC 555 flips back and closes the transistor $T_2$. The collector potential of the transistor $T_2$ rises thereupon to plus, raising also the base of transistor $T_1$, which will also be closed accordingly. The capacitor $C_1$ will be discharged thereupon via the resistances $R_{CT}$ and $R_T$ into pin 7 which is put on ground internally in the IC 555. As soon as the capacitor $C_1$ is discharged until a lower threshold the output 3 flips back and opens the transistors $T_2$. Thereby the potential at point $P_1$ is drawn to ground, the transistor $T_1$ opens and the charging of the capacitor $C_1$ via the resistances $R_{CT}$ and $R_T$ restarts again. The slope of the collector potential of the transistor $T_2$ shows a rectangular oscillation, the frequency of which depends on the resistance $R_T$, the on:off ratio being 1.

Subsequently the oscillating signal of the collector of transistor $T_2$ is fed into a microprocessor (not shown), which calculates the frequency of this signal by counting the number of pulses during a unit of time. The resistance $R_T$ resp. its temperature may be determined by comparison with a stored curve.

FIG. 1 comprises a further temperature dependent resistance 7 which is at the same temperature as the environment so that by measuring the temperature of the resistance 7, which may be carried out in a way analogous to the measurement of the resistance-films 5 and 6, a reference signal is obtained which may be used to determine the air temperature, on the one hand, and to correct the signals which were influenced thereby.

Since the cooling effect of the wind depends not only on the wind speed but also on the temperature of the moving air, the environmental temperature has to be eliminated in order to obtain accurate results for the wind speed. This may by carried out by measuring the temperature by resistance 7 and subtracting the same from the temperature measured by the resistance-film 5. Thereby, the obtained signal represents the difference between the environmental temperature and the temperature of the sensor. This difference is a function of the wind speed.

Depending on the direction of the wind, the temperature of the cylinder 3 is not constant around its periphery, since the cooling effect of the wind at that side of the cylinder which is exposed to the wind is higher than on the opposite side. Along the intermediate range of angles between the two extremities the temperature decreases according to a certain function. By measuring the temperatures at several points corresponding to the sub-resistances 6 it may be determined in which range of angles the maximum cooling effect occurs and, accordingly from which direction the wind blows. By comparison of the values of the sub-resistances left and right from the one which indicates a maximum value, the exact angle between two sub-resistances at which the wind hits the sensor may be determined by interpolation. Thereby the direction of the wind may be determined with an accuracy superior to one which may be obtained by simple repartition of the periphery in a number of sub-ranges.

The illustrated wind meter, resp. at least the sensor means, is protected against the sun by a housing (not shown), to avoid falsification of the temperature of the sensor means by radiation from the sun.

FIG. 4 shows a block diagram which illustrates the signal processing of the individual measuring resistances.

The schematically illustrated housing 1 of the wind meter comprises a sensor means 2 encompassing the heating coil 4, which is supplied by a supply 10, comprising a source of constant current.

The resistance 5, which corresponds to the resistance-film 5 of FIGS. 1 and 3, resp. to the resistance $R_T$ in FIG. 2, is connected to a circuit 11, which is illustrated as a black box and corresponds to the circuit of FIG. 2. The output of the circuit 11 is fed into a microprocessor.

The sub-sensors, corresponding to the sub-resistances 6 and 6' as well as to a plurality of not illustrated resistances, are connected to blocks 13 and 14 comprising identical circuits as block 11. Finally, resistance 7 for the measurement of the environmental temperature is connected to a block 12 comprising another circuit identical to the circuit of FIG. 2.

The blocks 11-14 and a plurality of not illustrated blocks which are connected to further sub-sensors 6 are connected to the microprocessor MP. The program of the microprocessor processes the input signals and produces a digital output signal 15 which, as already mentioned, is fed into a display or a control unit and has a value which is dependent on the wind speed.

I claim:

1. A method for the measurement of the speed and direction of the wind by means of a sensor device which is heated by a heating device, said sensor device being cooled by the wind in a manner such that a specific equilibrium temperature distribution is produced over the surface of the sensor device, wherein the temperature of angular sections of the sensor device which correspond to positions of electrical resistivity sensors, uniformly distributed over the periphery of the sensor device, is measured by said electrical resistivity sensor, comprising the steps of arranging said electrical resistivity sensors at the outer surface of said sensor device, measuring the temperature distribution at the outer surface of the sensor device using said electrical resistivity sensors, producing signals corresponding to the measured temperature from said electrical resistivity sensors, detecting the signal produced by the maximally cooled electrical resistivity sensor, and computing the direction of the wind by comparison of the signals produced by said maximally cooled electrical resistivity sensor and its two adjacent electrical resistivity sensors.

2. In a measuring device for measuring the direction of the wind, comprising a heated sensor which is exposed to the wind, a plurality of electrical resistivity sensors in intimate contact with said sensor device and a processing unit connected to said electrical resistivity sensor, wherein the sensor device comprises a heated mass which is heated by a heating device up to a desired equilibrium temperature distribution over its surface, the improvement wherein said electrical resistivity sensors are arranged at the outer surface of said sensor device, whereby the temperature distribution at the outer surface of the sensor device is measured by said electrical resistivity sensors, wherein said electrical resistivity sensors produce signals corresponding to the measured temperature, and wherein said processing unit comprises means for detecting the maximally cooled electrical resistivity sensor and then computing the direction of the wind by comparison of the signals produced by the maximally cooled electrical resistivity sensor and its two adjacent electrical resistivity sensors.

3. The improved measuring device as defined in claim 2, wherein said heated mass of said sensor device comprises a metal cylinder.

4. The improved measuring device as defined in claim 2, wherein said electrical resistivity sensors comprise electrical resistivity films circumferentially distributed around and electrically insulated from said heated mass.

5. The improved measuring device as defined in claim 4, wherein said electrical resistivity films each comprise a temperature-dependent resistivity arranged in a respective logic timing circuit for generating an oscillation having a frequency dependent on said resistivity.

6. The improved measuring device as defined in claim 5, wherein a logic timing circuit is connected to each resistivity film and each of said logic timing circuits produces a signal corresponding to the temperature measured by the respective electrical resistivity sensor.

7. The improved measuring device as defined in claim 6, wherein the signals produced by said logic timing circuits are fed to a microprocessor.

8. The improved measuring device as defined in claim 7, wherein the output of said microprocessor is connected to a display device.

9. The improved measuring device as defined in claim 7, wherein the output of said microprocessor is connected to a control device which controls a wind-sensitive process.

10. A method for the measurement of the speed and direction of the wind by means of a sensor device which is heated by a heating device, said sensor device being cooled by the wind in a manner such that a specific equilibrium temperature distribution is produced over the surface of the sensor device, wherein the temperature of angular sections of the sensor device which correspond to positions of electrical resistivity sensors, uniformly distributed over the periphery of the sensor device, is measured by said electrical resistivity sensors, comprising the steps of arranging said electrical resistivity sensors at the outer surface of said sensor device, measuring the temperature distribution at the outer surface of the sensor device using said electrical resistivity sensors, producing signals corresponding to the measured temperature from said electrical resistivity sensors, detecting the maximally cooled electrical resistivity sensor, and computing the direction of the wind by interpolation between the signals produced by the maximally cooled electrical resistivity sensor and its immediate left and right adjacent electrical resistivity sensors.

11. In a measuring device for measuring the direction of the wind, comprising a heated sensor device which is exposed to the wind, a plurality of electrical resistivity sensors in intimate contact with said sensor device and a processing unit connected to said electrical resistivity sensors, wherein the sensor device comprises a heated mass which is heated by a heating device up to a desired equilibrium temperature distribution over its surface, the improvement wherein said electrical resistivity sensors are arranged at the outer surface of said sensor device, whereby the temperature distribution at the outer surface of the sensor device is measured by said electrical resistivity sensors, wherein said electrical resistivity sensors produce signals corresponding to the measured temperature, and wherein said processing unit comprises means for detecting the maximally cooled electrical resistivity sensor and means for computing the direction of the wind by interpolation between the signals produced by the maximally cooled electrical resistivity sensor and its immediate left and right adjacent electrical resistivity sensors.

* * * * *